US012564866B2

(12) United States Patent
Fourney

(10) Patent No.: US 12,564,866 B2
(45) Date of Patent: Mar. 3, 2026

(54) STACKED-PACKAGE DETECTION SYSTEM

(71) Applicant: Laitram, L.L.C., Harahan, LA (US)

(72) Inventor: Matthew L. Fourney, Laurel, MD (US)

(73) Assignee: Laitram, L.L.C., Harahana, LA (US)

( * ) Notice: Subject to any disclaimer, the term of this patent is extended or adjusted under 35 U.S.C. 154(b) by 0 days.

(21) Appl. No.: 18/796,398

(22) Filed: Aug. 7, 2024

(65) Prior Publication Data

US 2024/0390943 A1    Nov. 28, 2024

Related U.S. Application Data

(63) Continuation of application No. 17/638,445, filed as application No. PCT/US2020/044556 on Jul. 31, 2020, now Pat. No. 12,059,710.

(60) Provisional application No. 62/909,399, filed on Oct. 2, 2019.

(51) Int. Cl.
| | |
|---|---|
| *B07C 1/14* | (2006.01) |
| *B07C 1/04* | (2006.01) |
| *B07C 3/08* | (2006.01) |
| *B65G 43/08* | (2006.01) |

(52) U.S. Cl.
CPC .................. *B07C 1/14* (2013.01); *B07C 1/04* (2013.01); *B07C 3/08* (2013.01); *B65G 43/08* (2013.01); *B65G 2203/0216* (2013.01)

(58) Field of Classification Search
CPC .............. B07C 1/14; B07C 3/08; B65G 43/08
USPC ........................................................ 209/555
See application file for complete search history.

(56) References Cited

U.S. PATENT DOCUMENTS

| | | | | |
|---|---|---|---|---|
| 3,252,595 A | * | 5/1966 | Collins | .................... B07C 3/08 |
| | | | | 198/597 |
| 6,076,683 A | | 6/2000 | Okada et al. | |
| 6,401,936 B1 | | 6/2002 | Isaacs et al. | |
| 8,631,922 B2 | | 1/2014 | Stone et al. | |
| 2004/0026300 A1 | | 2/2004 | Kibbler et al. | |
| 2014/0172155 A1 | * | 6/2014 | Neiser | .................. B65G 43/08 |
| | | | | 700/230 |
| 2015/0001138 A1 | | 1/2015 | Brunsen | |
| 2020/0222948 A1 | | 7/2020 | Idera et al. | |

FOREIGN PATENT DOCUMENTS

| | | |
|---|---|---|
| CN | 107051889 A | 8/2017 |
| KR | 10-2011-0085715 A | 7/2011 |

OTHER PUBLICATIONS

English translation of the Third Office Action of Chinese Patent Application No. 2020800609530, mailed Aug. 8, 2024, China National Intellectual Property Administration.

* cited by examiner

*Primary Examiner* — Molly K Devine
(74) *Attorney, Agent, or Firm* — James T. Cronvich

(57) ABSTRACT

A stacked-package detection system for a matrix sorter detects stacked packages by comparing weight or dimension measurements on primary sorters from those measurements on secondary sorters. Weight or dimension increases for a package on a secondary sorter indicate a stack of packages. A recirculation system diverts packages identified on the secondary sorters as stacked packages back into bulk flow to be reprocessed by the primary or secondary sorters.

16 Claims, 2 Drawing Sheets

STACKED-PACKAGE DETECTION SYSTEM

CROSS-REFERENCE TO RELATED APPLICATIONS

This application is a continuation of co-pending U.S. patent application Ser. No. 17/638,445, filed Feb. 25, 2022, which is a 371 of International Application No. PCT/US2020/044556, filed Jul. 31, 2020, which claims the benefit of U.S. provisional Patent Application No. 62/909,399, filed Oct. 2, 2019.

TECHNICAL FIELD

The invention relates generally to power-driven conveyors and in particular to sorting conveyors for sorting packages.

BACKGROUND

A matrix sorter is a network of primary and secondary sorters arranged to sort a bulk flow of packages rapidly to many destinations. An incoming bulk flow of packages is distributed evenly to the primary sorters. The primary sorters singulate, weigh, scan, and measure each package. Every package identified by a primary sorter is assigned a destination. The primary sorters sort the packages according to their assigned destinations, which can be along the primary sorters or along the secondary sorters. The secondary sorters sort packages they receive from the primary sorters to final destinations along the secondary sorters. Optionally, the primary sorters can also sort some packages directly to final destinations short of the secondary sorters. Packages sorted to the secondary sorters are inserted into a bulk flow for each secondary sorter by the primary sorters. Because those packages are returned to bulk flows, each secondary sorter resingulates, scans, and sorts those packages to their final destinations.

Occasionally packages are not properly singulated into individual packages. For example, two or more packages can overlap or be stacked atop one another. It's common to station a human operator just upstream of the scanning system of each sorter to unstack stacked packages and to face packages so that their tags or labels, which include unique identification information, can be scanned and read. Recirculation conveyors are used to recirculate packages that are not identified by the primary sorter's scanning systems or are too heavy or too large back into the incoming bulk flow. The recirculated packages then have another opportunity to be singulated and faced properly by the automated primary sorters. In a matrix sorter in which the secondary sorters are unmanned, stacked packages with only one package tag or label visible are sorted according to the scanned tag. So any unread packages in the stack are sent to the wrong destination.

SUMMARY

One version of a sorting system embodying features of the invention comprises a plurality of primary sorters and a plurality of secondary sorters. Each primary sorter includes a primary identification and sizing system reading identification marked on packages and measuring package sizes and sorting packages to a plurality of primary destinations according to the identification. Each secondary sorter includes a secondary identification and sizing system reading identification marked on packages and measuring package sizes and sorting the packages to a plurality of secondary destinations according to the identification. Some of the secondary destinations are final secondary destinations.

A primary infeed conveyor supplies packages to be sorted to the primary sorters. Each of a plurality of secondary infeed conveyor lines supplies packages to be sorted to a corresponding one of the plurality of secondary sorters. At least some of the primary destinations of each of the primary sorters are the plurality of secondary infeed conveyor lines. A primary recirculation system is configured to convey back to the primary infeed conveyor those packages on the primary sorters that are unidentifiable by the primary identification and sizing system or are identified by the primary identification and sizing system as groups of overlapping or stacked packages. A secondary recirculation system is configured to convey back to the primary infeed conveyor or to a manned station those packages on the secondary sorters that are unidentifiable by the secondary identification and sizing system or are identified by the secondary identification and sizing system as having a final destination on another secondary sorter.

Another version of a sorting system comprises a plurality of primary sorters and a plurality of secondary sorters. The secondary sorters are configured to sort packages to final destinations along the secondary sorters. A primary infeed conveyor distributes packages to the plurality of primary sorters. Each of a plurality of secondary infeed conveyors conveys packages received from the primary sorters to an associated one of the secondary sorters. A primary recirculation system is configured to return packages from the primary sorters to the primary infeed conveyor line. A secondary recirculation system is configured to selectively return packages from each of the secondary sorters to the primary infeed conveyor line or to the associated secondary infeed conveyor line.

DETAILED DESCRIPTION

Figure 1:
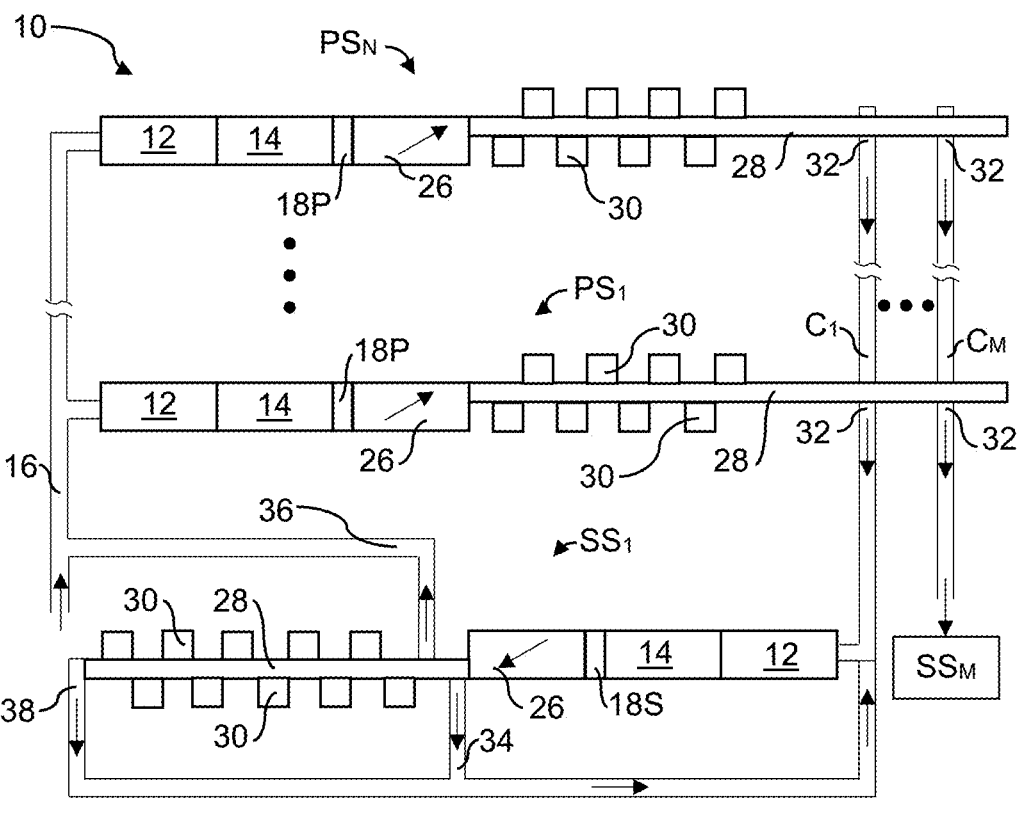
FIG. 1 is a simplified schematic of a portion of a matrix sorter embodying features of the invention.

A portion of a matrix sorter embodying features of the invention is shown in FIG. 1. The matrix sorter 10 includes N primary sorters $PS_1$-$PS_N$ and M secondary sorters $SS_1$-$SS_M$. (A generic primary sorter is referred to as $PS_n$, where the index n is any integer from 1 to N; and a generic secondary sorter is referred to as $SS_m$, where the index m is any integer from 1 to M. Only two primary sorters $PS_1$, $PS_N$ and only the secondary sorter $SS_1$ are shown in FIG. 1 as an example to simplify the drawing.) Each primary and secondary sorter includes a singulator 12 and a gapper 14. Preceding each singulator 12 is a destacking conveyor (not indicated in FIG. 1). A primary infeed conveyor line 16 evenly distributes a bulk flow of packages to each of the one or more primary sorters $PS_1$-$PS_N$. The singulator 12 and the gapper 14 space the packages apart into individual packages or occasionally into undesired groups of overlapping, or stacked, packages.

Downstream of the singulator 12 and the gapper 14, the singulated packages pass through an identification and sizing system 18P, 18S, which in this version is a check-weigher-camera system. The checkweigher measures the weight W of each package, and the camera scans each package to produce a digital image from which the dimensions D of each package can be measured. From the digital image, a unique identification marked on a tag or label affixed to each package can be read. So, in this version of the identification and sizing system, each package is identified by the unique package identification read from a tag scan S. And associated with each tag scan S are the package's weight W and dimensions D as measures of the package's size. In other versions only the weight W or only the dimensions D are measured along with the tag scan S. In some versions the weight W can be estimated from the dimensions D without a checkweigher or other weigh scale. And in other versions the tags can be scanned by a barcode or other dedicated tag reader to identify packages. Or package dimensions may be measured by other optical devices, such as light curtains or range finders.

Figure 2:
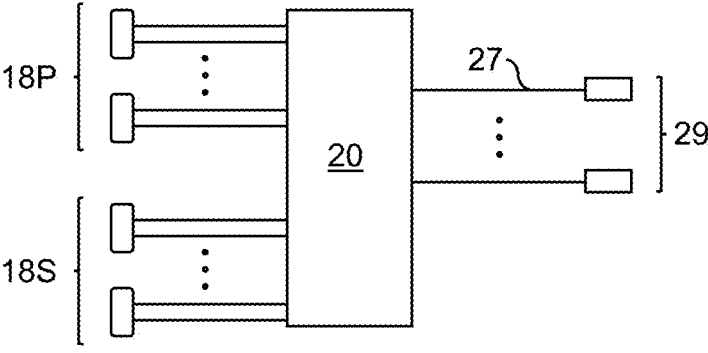
FIG. 2 is a block diagram of a controller used in a matrix sorter as in FIG. 1.

As shown in FIG. 2, a controller 20, which may be realized as a programmable controller or other programmable processor or computing device or a networked group of individual such controllers, executes program instructions in program memory that process the identification and size (weight W or dimension D measurement or both) for each package. The controller 20 stores the measurements of the tag scan S for each package in data memory accessible by the controller. Based on the package's identity from the tag scan S, the controller 20 assigns each package a destination. The controller 20 receives the data from the identification and sizing system 18P in each of the N primary sorters $PS_1$-$PS_N$ and from the identification and sizing system 18S in each of the M secondary sorters $SS_1$-$SS_M$.

As shown in FIG. 1, each primary sorter $PS_n$ and secondary sorter $SS_m$ has a merge conveyor 26 that merges the gapped packages into a single file and feeds them onto a linear sorter 28. The linear sorters 28 each have multiple sort destinations: final destinations 30 for the one or more secondary sorters $SS_M$ and final and non-final destinations 30, 32 for the one or more primary sorters $PS_n$. The controller directs a package assigned a final destination 30 along a primary sorter $PS_n$ off the sorter to the package's final destination. Packages assigned a final destination along a secondary sorter $SS_m$ are routed off the primary sorters $PS_n$ to one of the non-final destinations 32, which are realized as the M secondary infeed conveyor lines $C_1$-$C_M$. Each secondary infeed conveyor line $C_1$-$C_M$ conveys the packages from all the primary sorters $PS_1$-$PS_N$ to one of the secondary sorters $SS_m$. Because packages are sorted onto the secondary infeed conveyor lines $C_m$ asynchronously by the N primary sorters $PS_n$, the packages once again form an unsingulated bulk flow. The singulators in the secondary sorters $SS_m$ singulate the packages before they are sorted to their final destinations. The controller 20 sends sort signals 27 to sorting actuators 29 on the secondary sorters $SS_m$ that divert the packages to their assigned final destinations.

Because packages on the secondary infeed conveying lines $C_1$-$C_M$ are conveyed in a mass flow that includes stacked packages and packages faced with their tags occluded, each secondary sorter has an identification and sizing system 18S that gathers the same information as the primary identification and sizing systems 18P. The controller compares the size measurements—weight W or dimensions D or both—at the secondary sorters $SS_m$ to the size measurements at the primary sorters $PS_n$ for each matching package tag scan S. If the magnitude of the difference in the weights W or the dimensions D exceeds a maximum allowable weight difference or dimension difference indicating the detection of a package stack, the controller diverts the stack off the secondary linear sorter 28 to a local recirculation system 34 that recirculates the stack back into the input of the secondary sorter $SS_m$ it exited so that its singulator 12 and gapper 14 can again try to separate the packages in the stack.

If the secondary identification and sizing system 18S of a secondary sorter $SS_m$ reads no tags or two or more tags in each package-group scan, the controller directs the linear sorter 28 to divert the package group to the recirculation system via a recirculation conveyor either to the local recirculation system 34, which returns the packages to that secondary sorter, or to a primary recirculation system 36, which returns the packages to the primary infeed conveying line 16. For example, if all the package tags on a given secondary sorter $SS_m$ are occluded and can't be read or if multiple tags are read in one package group and all the tags are for packages destined for final destinations along the given secondary sorter, the controller recirculates those packages with the local recirculation system 34. But if multiple package tags are read for a package group and one or more of the tags identify a package destined for another secondary sorter, the controller commands the linear sorter 28 to divert the package group to the primary recirculation system 36 to be reinserted into the bulk flow on the primary infeed conveyor line 16. And, finally, any packages that are not sorted off the secondary linear sorter 28 are recirculated back to the sorter's input by a recirculation path 38 that is part of the matrix sorter's recirculation system. Alternatively, that recirculation path could lead back to the primary infeed conveyor line 16.

Figure 3:
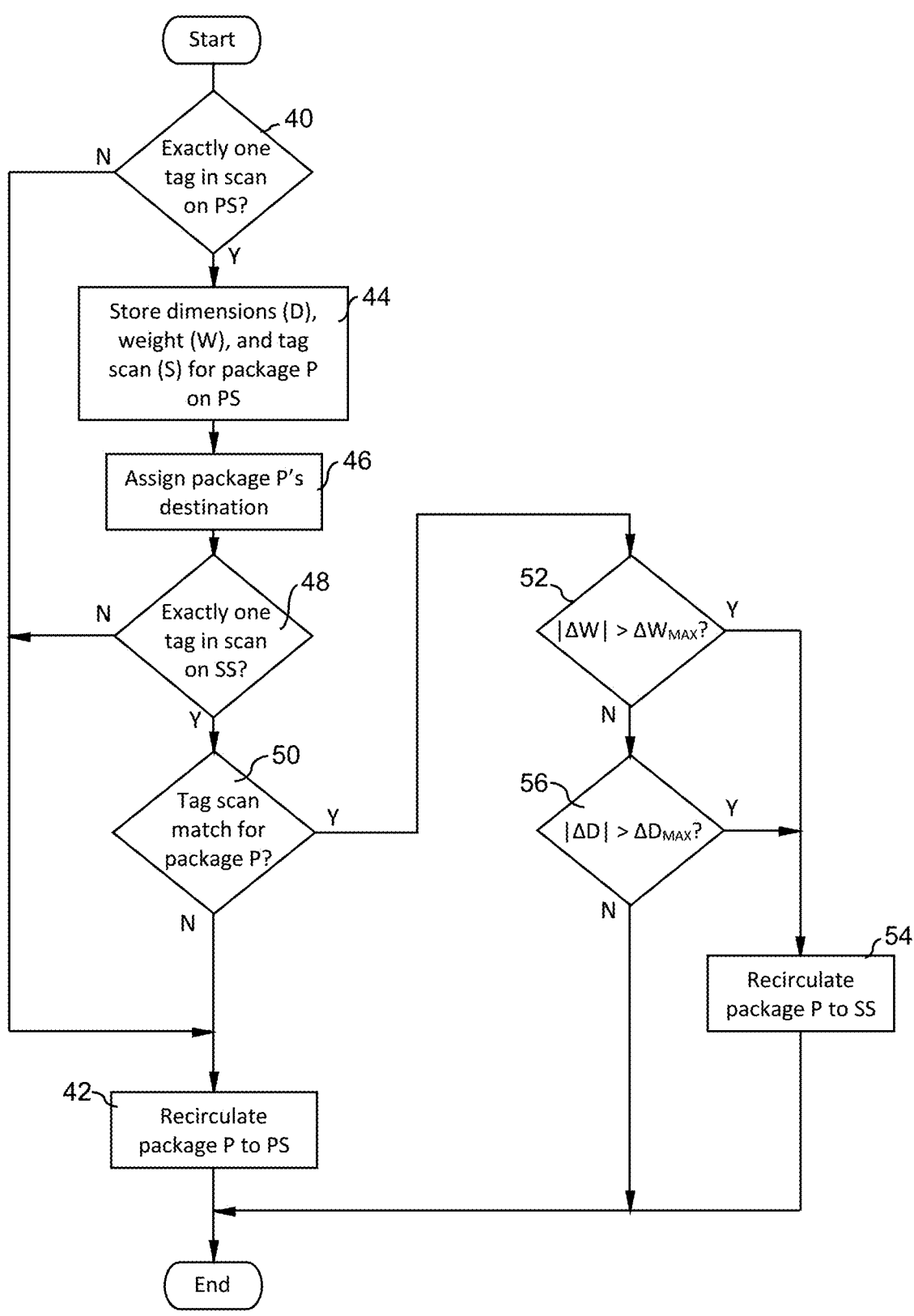
FIG. 3 is a flowchart of program steps executed by the controller of FIG. 2 to detect stacked packages and take appropriate remedial action.

A simplified flowchart of one example of the program steps stored in program memory and executed by the controller is shown in FIG. 3 for one primary sorter $PS_n$ and one secondary sorter $SS_m$. First, the controller checks the results of a primary sorter tag scan on a singulated package or a group of overlapping or stacked packages at step 40. If the controller detects more or less than a single tag in the scan, the controller commands the linear sorter to recirculate the package group back to the primary infeed conveyor line to be conveyed to one of the primary sorters at step 42. If only a single package tag is detected, the controller stores the package's size measurements (weight W or dimensions D or both) for the tag scan S in memory at step 44. From the package's unique identification tag scan S, the controller assigns the package P a final destination at step 46. If the package P has a final destination along the secondary sorter $SS_m$, the secondary identification and sizing system's identification tag scan S is checked at step 48. If more or less than a single tag scan S is detected for the scan, the controller commands the secondary linear sorter to recirculate the package or package group to the primary sorters $PS_n$. If only a single identification package tag appears in the scan, the controller checks the tag scan S for an identification match with a primary sorter tag scan of a package whose final destination is along the secondary sorter at step 50. If there is no match, the package P is recirculated back to the primary sorters $PS_1$-$PS_N$. If there is a match, the controller, at step 52, compares the difference between the weight measurements $|\Delta W|$ at the primary and secondary sorters to a preset maximum allowable weight difference $\Delta W_{MAX}$. If the magnitude of the weight difference $|\Delta W|$ exceeds the preset value $\Delta W_{MAX}$, the controller commands the secondary linear sorter to recirculate the package P back to the secondary sorter's corresponding infeed conveyor line at step 54. If the weight difference is allowable, the controller then performs a similar comparison of the dimensions D at step 56. If the magnitude of the difference in dimensions $|\Delta D|$ from the primary measurement to the secondary measurement exceeds a preset maximum allowable dimension difference $\Delta D_{MAX}$, the controller commands the secondary linear sorter to recirculate the package P back to the secondary sorter's input. If the weight W or dimensions D of the package P increase more than the maximum allowable, the package is identified as a stacked package requiring recirculation. Otherwise, the package P checks out and is sorted to its appropriate final destination along the secondary linear sorter.

Although the invention has been described with respect to a few exemplary versions, other versions are possible. For example, a recirculation system, including recirculation conveyors, on the primary sorters could, and typically would, be in place to recirculate packages that fail to meet identification or size criteria back to the primary infeed conveyor lines. Instead of recirculating packages that fail to meet identification or size criteria, the sorters could convey those packages to a manned station to be manually handled. As another example, a matrix sorter as described can be extended by adding tertiary sorters receiving packages from the secondary sorters.

What is claimed is:

1. A sorting system comprising:
a plurality of primary sorters, each including a primary identification and sizing system reading identification marked on packages and measuring package sizes and sorting packages to a plurality of primary destinations according to the identification;
a plurality of secondary sorters, each including a secondary identification and sizing system reading identification marked on packages and measuring package sizes and sorting the packages to a plurality of secondary destinations according to the identification, wherein some of the secondary destinations are final secondary destinations;
a primary infeed conveyor supplying packages to be sorted to the primary sorters;
a plurality of secondary infeed conveyor lines, each supplying packages to be sorted to a corresponding one of the plurality of secondary sorters;
wherein at least some of the primary destinations of each of the primary sorters are the plurality of secondary infeed conveyor lines;
a primary recirculation system configured to convey back to the primary infeed conveyor those packages on the primary sorters that are unidentifiable by the primary identification and sizing system or are identified by the primary identification and sizing system as groups of overlapping or stacked packages;
a secondary recirculation system configured to convey back to the primary infeed conveyor or to a manned station those packages on the secondary sorters that are unidentifiable by the secondary identification and sizing system or are identified by the secondary identification and sizing system as having a final destination on another secondary sorter.

2. The sorting system as claimed in claim 1 wherein the secondary recirculation system is configured to convey directly back to each secondary sorter those packages identified by the corresponding secondary identification and sizing system as groups of overlapping or stacked packages identified as having a final destination along that secondary sorter.

3. The sorting system as claimed in claim 1 comprising a controller executing program steps to compare the sizes measured by the primary identification and sizing system for each package to the sizes measured by the secondary identification and sizing system to detect stacked or overlapping packages from changes in the sizes of identified packages.

4. The sorting system as claimed in claim 1 wherein each of the primary and secondary sorters includes a singulator upstream of the corresponding primary or secondary identification and sizing system arranged to space the packages apart across gaps in a single file and wherein the size measured by the primary and secondary identification and sizing systems is at least one of the weight and the dimensions of each singulated package or of each group of stacked packages passing through the corresponding primary or secondary identification and sizing system.

5. The sorting system as claimed in claim 1 wherein some of the primary destinations are final primary destinations.

6. The sorting system as claimed in claim 1 wherein the packages on the primary sorters and the secondary sorters are weighed by the primary and secondary identification and sizing systems to determine their weights as measures of their sizes.

7. The sorting system as claimed in claim 1 wherein the primary and secondary identification and sizing systems scan the packages on the primary sorters and the secondary sorters to determine the package dimensions as measures of their sizes.

8. A sorting system comprising:
a plurality of primary sorters;
a plurality of secondary sorters configured to sort packages to final destinations along the secondary sorters;
a primary infeed conveyor distributing packages to the plurality of primary sorters;
a plurality of secondary infeed conveyors, each conveying packages received from the primary sorters to an associated one of the secondary sorters;
a primary recirculation system configured to return packages from the primary sorters to the primary infeed conveyor line;
a secondary recirculation system configured to selectively return packages from each of the secondary sorters to the primary infeed conveyor line or to the associated secondary infeed conveyor line;
wherein the plurality of primary sorters are configured to sort packages to final destinations along the primary sorters.

9. A sorting system comprising:
a plurality of primary sorters;
a plurality of secondary sorters configured to sort packages to final destinations along the secondary sorters;
a primary infeed conveyor distributing packages to the plurality of primary sorters;
a plurality of secondary infeed conveyors, each conveying packages received from the primary sorters to an associated one of the secondary sorters;
a primary recirculation system configured to return packages from the primary sorters to the primary infeed conveyor line;
a secondary recirculation system configured to selectively return packages from each of the secondary sorters to the primary infeed conveyor line or to the associated secondary infeed conveyor line;
wherein each of the primary sorters includes a primary identification and sizing system configured to read identification marked on packages and measure package sizes and wherein each of the secondary sorters includes a secondary identification and sizing system configured to read identification marked on packages and measure package sizes.

10. The sorting system as claimed in claim 9 wherein the plurality of primary sorters are configured to sort packages to final destinations along the primary sorters.

11. The sorting system as claimed in claim 9 wherein packages unidentified by the primary identification and sizing systems are sent by the primary sorters to the corresponding primary recirculation systems.

12. The sorting system as claimed in claim 9 wherein packages unidentified by the secondary identification and sizing systems are sent by the secondary sorters to the corresponding secondary recirculation systems to return the unidentified packages to the primary infeed conveyor line.

13. The sorting system as claimed in claim 9 wherein packages identified by the secondary identification and sizing systems as having final destinations along the secondary sorters and determined by the secondary identification and sizing systems as stacked or overlapping packages are sent by the secondary sorters to the corresponding secondary recirculation systems to return the unidentified packages to the associated secondary infeed conveyor lines.

14. The sorting system as claimed in claim 9 wherein if the sizes of packages measured by the secondary identification and sizing systems exceed the sizes of packages bearing the same identification measured by the primary identification and sizing systems, those packages are classified as overlapping or stacked packages.

15. The sorting system as claimed in claim 9 wherein each of the primary and secondary identification and sizing systems includes a camera producing digital images of the packages from which the sizes of the packages are measured.

16. The sorting system as claimed in claim 15 wherein the identifications of the packages are determined from the digital images.

* * * * *